(12) United States Patent
Yamada

(10) Patent No.: US 8,676,437 B2
(45) Date of Patent: Mar. 18, 2014

(54) VEHICLE TEST SYSTEM INCLUDING PLURALITY OF APPARATUSES MUTUALLY COMMUNICABLE VIA NETWORK

(75) Inventor: Mitsuo Yamada, Kariya (JP)

(73) Assignee: Denso Corporation, Kariya (JP)

( * ) Notice: Subject to any disclaimer, the term of this patent is extended or adjusted under 35 U.S.C. 154(b) by 386 days.

(21) Appl. No.: 12/755,761

(22) Filed: Apr. 7, 2010

(65) Prior Publication Data
US 2010/0256860 A1 Oct. 7, 2010

(30) Foreign Application Priority Data

Apr. 7, 2009 (JP) ................................. 2009-093147

(51) Int. Cl.
*G01M 17/00* (2006.01)
*G06F 7/00* (2006.01)
*G06F 11/30* (2006.01)
*G07C 5/00* (2006.01)
*G06F 19/00* (2011.01)

(52) U.S. Cl.
USPC .................... 701/29.6; 701/29.1; 701/29.2

(58) Field of Classification Search
USPC ................................................ 701/29.1–34.4
See application file for complete search history.

(56) References Cited

U.S. PATENT DOCUMENTS

| 5,884,202 | A * | 3/1999 | Arjomand | 701/31.4 |
| 6,181,994 | B1 * | 1/2001 | Colson et al. | 701/31.5 |
| 6,330,499 | B1 * | 12/2001 | Chou et al. | 701/31.4 |
| 6,370,454 | B1 * | 4/2002 | Moore | 701/29.4 |
| 6,484,082 | B1 * | 11/2002 | Millsap et al. | 701/48 |
| 6,694,235 | B2 * | 2/2004 | Akiyama | 701/29.6 |
| 6,928,345 | B2 * | 8/2005 | Quinn | 701/32.1 |
| 7,103,460 | B1 * | 9/2006 | Breed | 701/32.9 |
| 7,142,960 | B2 * | 11/2006 | Grier et al. | 701/29.1 |
| 7,289,446 | B2 * | 10/2007 | Itoi | 370/235 |
| 7,359,775 | B2 * | 4/2008 | Strege et al. | 701/31.4 |
| 7,447,576 | B2 * | 11/2008 | Ban et al. | 701/36 |

(Continued)

FOREIGN PATENT DOCUMENTS

| JP | 05-201294 | 8/1993 |
| JP | 2002-157622 | 5/2002 |

(Continued)

OTHER PUBLICATIONS

Japanese Office Action dated Dec. 14, 2010, issued in corresponding Japanese Application No. 2009-093147 with English Translation.

*Primary Examiner* — Ryan Zeender
*Assistant Examiner* — Allen Chein
(74) *Attorney, Agent, or Firm* — Nixon & Vanderhye PC

(57) ABSTRACT

A vehicle test system including a plurality of apparatuses mutually communicable via a network. A control apparatus included in the apparatuses controls two or more objects in the vehicle by using respective control modules each having fault detecting module used to detect fault in the object being controlled. A test apparatus connected to the control apparatus commands any one of the control module included in the control apparatus in order to read out fault information in the objects. The control apparatus generates, in response to the test apparatus, a response command indicative of the fault information detected by the fault detecting module and transmits the response command to the test apparatus via the network. The response commands includes both fault information corresponding to the control module to which the test apparatus commands and fault information corresponding to the other control module.

15 Claims, 11 Drawing Sheets

(56) References Cited

U.S. PATENT DOCUMENTS

| | | | |
|---|---|---|---|
| 7,480,550 B2* | 1/2009 | Huber et al. | 701/31.4 |
| 7,734,287 B2* | 6/2010 | Ying | 455/423 |
| 7,813,852 B2* | 10/2010 | Kato et al. | 701/31.4 |
| 8,019,501 B2* | 9/2011 | Breed | 701/31.9 |
| 2004/0085198 A1* | 5/2004 | Saito et al. | 340/438 |
| 2004/0133319 A1* | 7/2004 | Pillar et al. | 701/29 |
| 2005/0027404 A1* | 2/2005 | Ban et al. | 701/1 |
| 2006/0020380 A1* | 1/2006 | Saito et al. | 701/29 |
| 2007/0030844 A1 | 2/2007 | Fukuta et al. | |
| 2007/0213895 A1 | 9/2007 | Nakayama | |
| 2011/0167145 A1* | 7/2011 | Bush et al. | 709/223 |

FOREIGN PATENT DOCUMENTS

| | | |
|---|---|---|
| JP | 2002-228551 | 8/2002 |
| JP | 2007-038921 | 2/2007 |
| JP | 2007-240436 | 9/2007 |

* cited by examiner

FIRST TEST SYSTEM

FIRST TEST APPARATUS

INTEGRATED ECU

FIG. 4A
CAN-ID SENDING REQUEST COMMAND
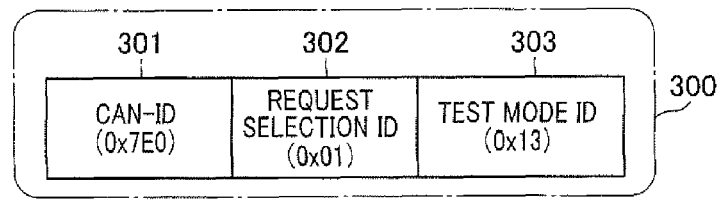
FIG. 4B
CAN-ID RESPONSE COMMAND
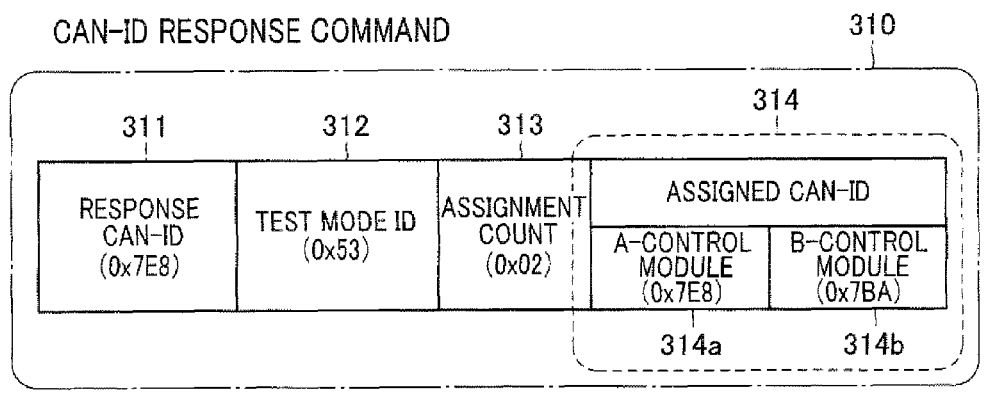
FIG. 4C
CAN-ID TABLE
| ID | CAN-ID |
|---|---|
| 1 (INTEGRATED ECU) | 0x7E8 |
|  | 0x7BA |
| 2 (FIRST ECU) | ... |
| 3 (SECOND ECU) | ... |
| ... | ... |

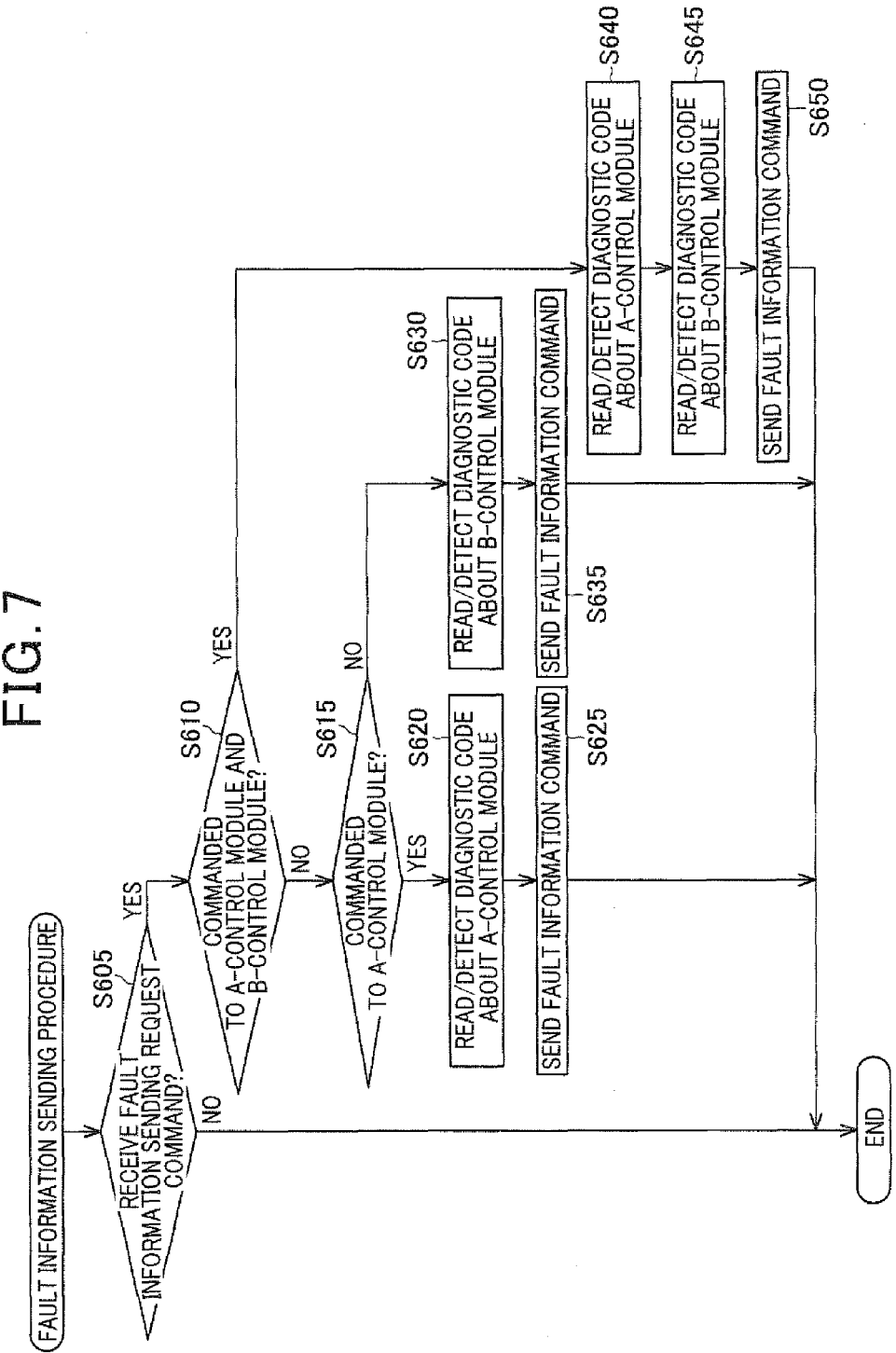

FAULT INFORMATION SENDING REQUEST COMMAND

FAULT INFOMRATION COMMAND

CAN-ID DATABASE

| VEHICLE CODE | ID | CAN-ID |
|---|---|---|
| XXXX | 1 (INTEGRATED ECU) | 0x7E8 |
| | | 0x7BA |
| | 2 (FIRST ECU) | ... |
| | 3 (SECOND ECU) | ... |
| ... | ... | ... |

FAULT INFORMATION SENDING REQUEST INSTRUCTION PROCEDURE

VEHICLE TEST SYSTEM INCLUDING PLURALITY OF APPARATUSES MUTUALLY COMMUNICABLE VIA NETWORK

CROSS-REFERENCE TO RELATED APPLICATION

This application is related to Japanese Patent Application No. 2009-93147 filed on Apr. 7, 2009, the contents of which are hereby incorporated by reference.

BACKGROUND OF THE INVENTION

1. Field of the Invention

The present invention relates to a test system, and more particularly, a test system including a test apparatus used for detecting faults which may occur in on-vehicle devices.

2. Description of the Related Art

Various types of on-vehicle ECUs (Electronic Control Units) have been used to control operation of on-vehicle devices such as engines, air conditioners, and others.

In order to achieve the control, an ECU is configured to communicate with various sensors and actuators. Thus, the ECU should have the capability of processing various data from and to the sensors and actuators. In some cases, a plurality of ECUs mounted on the same vehicle are electrically and communicably connected to each other via a vehicle LAN (Local Area Network) and communication IDs (identifications) are assigned to the ECUs respectively.

When an inspection is needed to detect a fault which may occur in the ECU, a test system dedicated to the inspection may be used. Specifically, Japanese Patent Application Laid-open Publication No. 2007-38921 discloses one type of test system, which is, for instance, an external tool which can be connected to the ECU via the vehicle LAN when being necessary. The external tool issues a command to the ECU so that the command allows the ECU to inspect the fault and to collect information concerning the fault, whereby the inspection can be conducted from outside the vehicle.

In recent years, the number of ECUs incorporated in electric control systems mounted on the same vehicle has increased with a rise in sophistication and high-function required control the behavior of the vehicle. This trend is continuing, and it is expected that the number of ECUs necessary in the same vehicle will increase in the future.

However, the space inside a vehicle is usually limited, thus, limiting the number of ECUs mountable in the vehicle. Of course, increasing the number of ECUs results in an increase in the vehicle weight and power consumption. This also limits the number of ECUs for each vehicle. For this reason, there has been known an alternative technique that two or more of all the ECUs are combined into a single ECU. Hereinafter, this ECU will be referred to as an integrated ECU in the present application.

Since the integrated ECU is communicably connected to other ECUs via a vehicle LAN similarly to the ECUs used before the integration, it is necessary to assign a communication ID to the integrated ECU. For instance, a new communication ID can be assigned to the integrated ECU. However, since it is usual that the ECUs include various types of ECUs with different specifications, the design has to consider many combinations of the communication IDs when ECUs are integrated.

Therefore, a lack of communication IDs which can be used for the assignment is likely to occur. In addition, when a new communication ID is assigned to the integrated ECU, it is required to strictly manage the assignment of the communication IDs to prevent communication IDs from being duplicated between the integrated ECU and another integrated ECU, which may also be arranged in the same vehicle. Accordingly, managing the assignment of the communication IDs will exert a significant burden on designers when integrating ECUs.

In this regard, to assign the communication ID for the integrated ECU, using a plurality of communication IDs being used by a plurality of ECUs which are being integrated to the integrated ECU, is proposed. As a result, problems such as lacking an amount of communication IDs and the duplication of the communication IDs used for the integrated ECUs can be avoided. Also, other ECUs trying to communicate with the ECUs being integrated (i.e., target ECU being integrated) can communicate with the individual ECU in the same way (i.e., communication IDs) as before the integration. In this way, the other ECU can communicate with the integrated ECU as the same way as before the integration. As a result, when the integration is performed, it is not required to renew the programs which are stored in the ECUs being not integrated.

However, according to the test system which is adapted to the above-described proposal, the test system has to order both of the integrated ECU and the individual ECU (i.e., target ECU being integrated) to be inspected as well as the other ECUs being communicate with the integrated ECU. Accordingly, when the test system is processing the inspection to the integrated ECU, despite that the number of ECU to be inspected is one, it is necessary to order the ECU to be inspected for multiple times. Therefore, the load of the processing in the test system increases.

SUMMARY OF THE INVENTION

The present invention has been made in light of the above situations mentioned above, and has as its object to provide a test system which can suppress an increase of a processing load for inspecting the integrated ECU.

To achieve the above-described object, a first aspect of the present invention is a test system for detecting a fault in control of a vehicle, having a plurality of apparatuses mutually communicable via a network arranged in the vehicle, the system comprising of a control apparatus mounted on the vehicle, having a plurality of objects being controlled which execute a series of procedures to perform at least one function and each object has a fault detecting module for detecting fault information about faults occurring at the object; a first communication means adapted to the control apparatus for communicating with other apparatuses via the network, receiving data sent from the other apparatus of which destination is any one of the objects being owned by the control apparatus and sending data concerning the object to the other apparatus; a test apparatus being electrically connected to the control apparatus via the network; a fault information reading means adapted to the test apparatus for reading fault information at the object being owned by the control apparatus; a second communication means adapted to the test apparatus for communicating with any one of the objects being owned by the control apparatus as a communication partner; and a transmission control means adapted to the control apparatus for transmitting the fault information at the object to the test apparatus based on a sending request command being sent by the fault information reading means; wherein the object executes the series of procedure in response to the received data which is sent from the other apparatus, the fault information reading means is configured to send the sending request command via the second communication means, to any one of the objects to send both the fault information included in the any one of the object and the fault information included in the other object, the transmission control means is configured to order the first communication means to transmit the fault information detected by the fault detecting module being included in the object designated by the sending request command, to the test apparatus when the first communication means receives the sending request command.

The control apparatus may be the integrated ECU as described above. In the integrated ECU, a program originally used at the ECU being integrated can be applied. However, the object can be a module or a process that are modified based on the program originally used at the ECU being integrated (hereinafter referred to object ECU for integration).

Also, the test apparatus includes a second communication means that performs data communication with any one of the objects being included in the control apparatus, as a communication partner and a fault information reading means that sends a sending request command via the second communication means. The sending request command is configured to order any one of the objects to send the fault information at the object together with fault information at the other object. The control apparatus further includes a transmission control means. The transmission control means is configured to order the first communication means to transmit the fault information detected by the fault detecting module being included in the object designated by the sending request command, to the test apparatus when the first communication means receives the sending request command.

As described, the test apparatus needs to know all communication IDs assigned to the ECUs being integrated, in order to inspect all functions of the integrated ECU. Then, the test apparatus orders each ECU being integrated individually to inspect the function.

For example, it is assumed that failures simultaneously occurring on the plurality of sensors or actuators and the like (hereinafter referred to sensor group) are as a result of a failure in the power supply circuit that supplies power to the sensor group. In this case, if each element of the sensor group belongs to each ECU being integrated, to detect the failure of the power supply circuit, the test apparatus has to know all communication IDs assigned to the ECUs being integrated that corresponds to the sensor group. Then, the test apparatus orders each of the ECUs being integrated individually to inspect the elements of the sensor group to detect failures of each element of the sensor group.

In the test system according to the first aspect of the present invention, the test apparatus sends the sending request command to any one of the object in the control apparatus. The sending request command is configured to order any one of the objects in the control apparatus to send the fault information at the object together with fault information at the other object. In the control apparatus such like the integrated ECU, when the sending request command is received by the ECU, fault information detected at a object designated by the sending request command is sent to the test apparatus.

Thus, the control apparatus sends the command once to the any one of object whereby the fault information at a plurality of objects can be detected. Therefore, the test apparatus do not necessarily read the communication IDs assigned to a plurality of objects so that the test apparatus can omit commanding inspection for multiple times. Hence, according to the test system described above, increasing processing load necessary for the inspection processed by the control apparatus e.g. integrated ECU can be suppressed and also increasing programming steps and execution time necessary for the inspection can be suppressed.

In addition, the control apparatus may be configured to respond to the test apparatus, that is, the transmission control means can be configured to generate a response command indicative of the fault information detected by the fault detecting modules and to order the first communication means to transmit the response command to the test apparatus.

Thus, the test apparatus can receive the fault information necessary from the control apparatus at the same time as a response to the sending request command. Accordingly, a processing load of the test apparatus can be decreased compared to the fault information being sent multiple times from the control apparatus.

Also, the sending request command may include additional code that indicates an order detection of the fault information at the other object other than the object to which the sending request command is sent.

Therefore, without significant change of the protocol that has been used before in the test system, additional commands that order detection of fault information regarding a plurality of objects being owned by the integrated ECU are newly defined. Accordingly, the integrated ECU and the test system can be developed without significant change of the conventional hardware and software whereby the development cost of the integrated ECU or the like can be decreased.

Further, the test apparatus can be mounted on the vehicle in which the control apparatus is mounted. Accordingly, the test apparatus can be configured to detect the fault information even if the vehicle is in running condition.

When the test apparatus orders the control apparatus to detect the fault information, the sending request command is sent to any one of objects. However, the test apparatus normally recognizes apparatuses in the vehicle LAN by reading the communication IDs assigned thereto. Regarding the communication IDs assigned to each object in the control apparatus, the test apparatus cannot recognize whether the communication IDs belong to the same apparatus or an individual apparatus. As a result, the test apparatus may send the sending request command to the plurality of objects in the control apparatus. In other words, the test apparatus may send the sending request command to the control apparatus for a multiple times.

In the test system according to the present invention, the test apparatus further includes: an ID obtaining means configured to send an ID request command to any one of the objects via the second communication means in which the ID request command is a request to send the entire communication IDs that the control apparatus concerning the object owns; and a memory control means configured to receive a plurality of the communication IDs as a response to the ID request command via the second communication means, to have the plurality of the communication IDs grouped and to store the grouped communication ID. Also, the control apparatus further includes an ID notifying means configured to send the entire communication ID of the objects that the control apparatus owns to the test apparatus via the first communication means, when the control apparatus received the ID request via the first communication means.

As described above, the test apparatus can recognize the plurality of communication IDs that are assigned to the test apparatus. Hence, when the test apparatus detects fault information in the control apparatus, the test apparatus can order any one of the object assigned to the control apparatus, to read the fault information. Thus, the inspection to the control apparatus can be done efficiently.

The test apparatus can be configured to read the fault information in the control apparatus as follows. That is, the test apparatus further includes a wireless communication means that is configured to communicate with a remote center being arranged outside of the system, and the fault information reading means can be configured to send the sending request command in response to a command received from the remote center via the wireless communication means. The test apparatus further includes a sending means that is configured to send the fault information to the remote center via the wireless communication means when the test apparatus receives the fault information as a response to the sending request command, from the test apparatus via the second communication means.

Thus, the fault information in the control apparatus can be read remotely read so that convenience of using the test system can be enhanced by this feature. Also, in the remote center communicating with the test apparatus via the wireless communication, it is expected that every apparatus connected to the test apparatus has to be recognized by the remote center using the communication ID. Therefore, the remote center has difficulty in judging whether the communication IDs assigned to each object in the control apparatus, corresponds to the same apparatus or individual apparatus.

In this case, it is required to order the control apparatus to read entire fault information at the same time. However, the remote center may orders the plurality of the objects to send the fault information corresponding to each of the object individually.

Here, the test apparatus according to the present invention further includes an ID obtaining means configured to send an ID request command in response to a received command from the remote center, to any one of the objects via the second communication means; wherein the ID request command is a request to send the entire communication ID that the control apparatus concerning the object owns; and an ID sending means configured to send a plurality of communication IDs to the remote center via the wireless communication means when the test apparatus received the communication ID in response to the ID request command via the second communication means, and the control apparatus further comprising an ID notifying means configured to send the entire communication ID of the objects that the control apparatus owns to the test apparatus via the first communication means, when the control apparatus received the ID request via the first communication means.

Thus, the remote center can recognize the plurality of communication IDs assigned to the control apparatus. Therefore, reading fault information at the control apparatus can be done efficiently.

Further, the control apparatus in the test system according to the first aspect of the present invention can be configured as an individual apparatus and can be utilized in the vehicle systems. Specifically, the control apparatus can be configured as a control apparatus as follows. That is, the control apparatus includes: a plurality of objects being controlled which execute a series of procedure to perform at least one function, each object has a fault detecting module for detecting fault information about faults occurring at the object; a communication means for communicating with other apparatus via the network, receiving data sent from the other apparatus of which sending destination is any one of the objects being owned by the control apparatus and sending data concerning the object to the other apparatus; wherein the object executes the series of procedure in response to the received data which is sent from the other apparatus; the communication means is configured to receive a sending request command sent from a test apparatus being connected to the network, the command orders any one of the objects that the control apparatus owns to send the fault information being included in any one of the objects and the fault information being included in the other object that the control apparatus owns; and the control apparatus further comprises a transmission control means that orders the communication means to transmit the fault information in response to the reception of the sending request command, the fault information being included in the objects that is designated by the sending request command, fault information being detected by the fault detecting module.

Also, the test apparatus in the test system according to the first aspect of the present invention can be configured as an individual apparatus and can be utilized in the vehicle systems. Specifically, the test apparatus used in the test system can be configured as a test apparatus as follows. That is, the test apparatus includes: a communication means for controlling data communication with any one of the objects as a communication partner; and a fault information reading means for reading fault information at the object being owned by the control apparatus; wherein the fault information reading means is configured to send a sending request command via the communication means, to any one of the objects to send both the fault information being included in the any one of the objects and the fault information being included in the other object.

In the test system according to the first aspect of the present invention, although the control apparatus or the test apparatus can be configured as an individual apparatus apart from the test system, each individual apparatus can be combined with corresponding apparatus, i.e., the control apparatus or the test apparatus, and can function as to obtain the same effects as described above. Moreover, the remote center as described above can be configured as follows.

That is, the remote center may includes: a remote communication means configured to communicate with the test to apparatus via the wireless communication; and a sending request means configured to send a request to the test apparatus via the remote communication means, the request requires sending fault information.

Furthermore, the sending request means in the remote center can be configured to send an ID notification command that requires the communication ID assigned to the each object that the control apparatus owns, to the test apparatus via the remote communication means. Then, the remote center receives a plurality of the communication IDs from the test apparatus as a response to the ID notification command via the remote communication means, make the plurality of the communication IDs grouped and store the grouped communication ID associated with a vehicle ID of the vehicle at which the test apparatus is mounted.

The remote center can be combined with the above-described test systems whereby the same effects as described above can be made.

BRIEF DESCRIPTION OF THE DRAWINGS

In the accompanying drawings:

FIGS. 4A to 4C are block diagrams showing CAN-ID commands such as CAN-ID sending request command and a table showing a CAN-ID table;

FIG. 7 is a flow chart showing a fault information sending procedure;

DETAILED DESCRIPTION OF THE PREFERRED EMBODIMENTS

With reference to accompanying drawings, hereinafter will be described an embodiment of the present invention. Embodiments of the present invention however are not limited to embodiments described below, but can be implemented in various modes as long as the embodiments are in a scope of the present invention.

First Embodiment

Figure 1A:
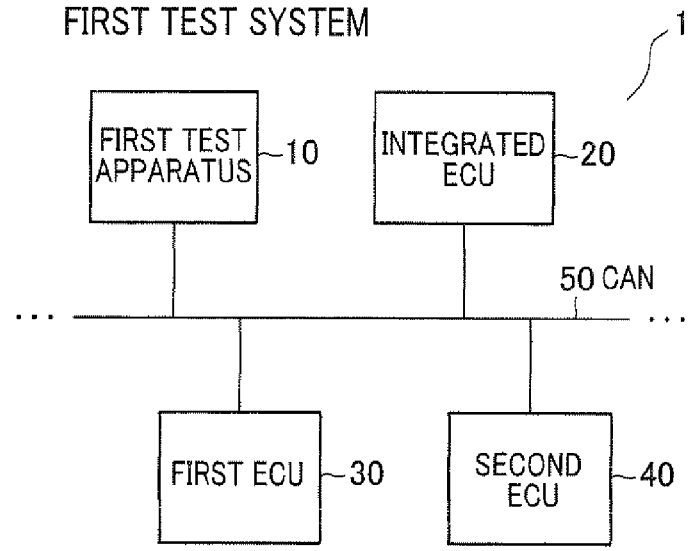
FIGS. 1A to 1C are block diagrams showing the configurations of a first test system, a first test apparatus and an integrated ECU respectively, according to a first embodiment of the present invention.

Hereinafter will be described the first test system according to the first embodiment of the present invention with reference to the drawings FIGS. 1A-1C to 8A-8B.
[Explanation of the Configuration]
(1) Configuration of the First Test System FIG. 1A illustrates a block diagram showing a configuration of the first test system 1 according to the first embodiment. The first test system 1 is a system mounted on the vehicle and includes a first test apparatus, an integrated ECU 20, a first ECU 30 and a second ECU 40. These units are electrically connected each other via a CAN (Controller Area Network) 50 which is used as a vehicle LAN. The CAN is a vehicle bus standard which defines a communication protocol used between devices connected to the vehicle bus. The first test system 1 has an ECU other than these ECUs, which is connected to the CAN 50 and this ECU is not shown in the FIG. 1.

Figure 1B:
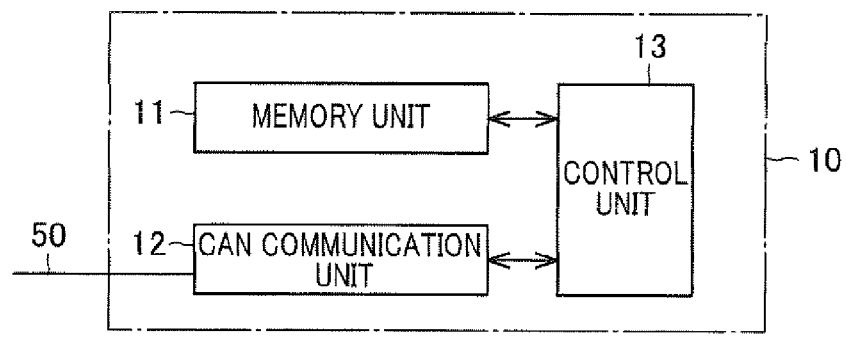

Next, the configuration of the first test apparatus 10 will be described with reference to the FIG. 1B as follows. The first test apparatus 10 includes a memory unit 11, a CAN communication unit 12 and a control unit 13. The memory unit 11 is configured as devices that do not require the memory retention such as a Flash memory or a HDD (Hard Disk Drive). The memory unit 11 can store various types of information.

The CAN communication unit 12 is a portion that communicates with apparatuses connected to the CAN 50. The control unit 13 comprises CPU (Central Processing Unit), ROM (Read Only Memory), RAM (Random Access Memory) and I/O (input and output), and controls each portions that constitute as the first test apparatus 10. The control unit 13 operates various processing on the basis of a program stored in the ROM and a program being loaded to the RAM from the memory unit 11.

Figure 1C:
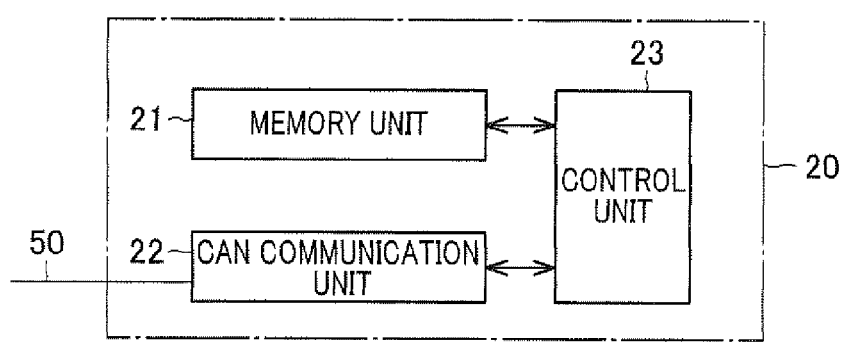

The configuration of the integrated ECU 20 will be described with reference to the FIG. 1C as follows. The integrated ECU 20 integrates an AECU and a BECU, and includes whole functions that the each ECU owns. The integrated ECU 20 includes a memory unit 21, a CAN communication unit 22 and a control unit 23 as well as the first test apparatus 10. Also, the integrated ECU 20 includes various actuators that the AECU and the BECU own.

Figure 2:
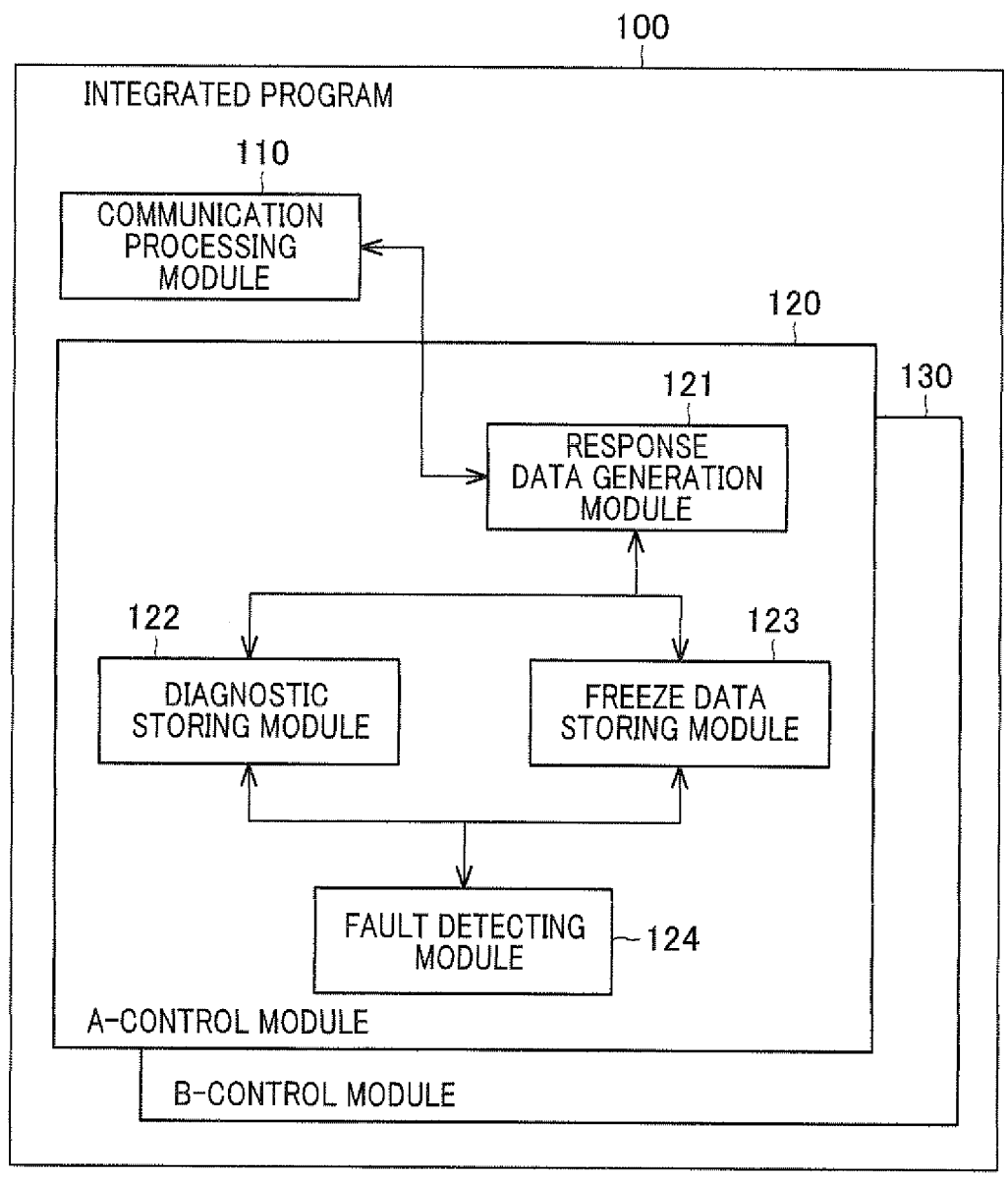
FIG. 2 is a block diagram showing a configuration of the integrated program.

Regarding the first ECU 30 and the second ECU 40, each includes a memory unit, a CAN communication unit and a control unit as well as the integrated ECU 20.
(2) Configuration of the Integrated Program With reference to a block diagram as shown in FIG. 2, the integrated program 100 which is stored in the integrated ECU 20 will be described as follows. The integrated program 100 includes modules comprising a communication processing module 110, an A-control module 120 and a B-control module 130.

The communication processing module 110 is a module that controls a communication with other apparatus via the CAN 50. Also, the A-control module 120 is provided based on a program originally used on the AECU being integrated to the integrated ECU 20 and therefore, the A-control module 120 is provided to achieve functions that the AECU owned.

Also, the B-control module 130 is provided based on a program originally used on the BECU being integrated to the integrated ECU 20 and therefore, the B module is provided to achieve functions that the BECU owned.

In addition, the AECU and the BECU are connected to the CAN 50 as well as the integrated ECU 20 and each ECU owns CAN-ID 0x7E0 and 0x7B2 respectively. In the A-control module 120, a CAN-ID of the AECU is assigned and in the B-control module, a CAN-ID of the BECU is assigned. Namely, two CAN-ID 0x7E0 and 0x7B2 are assigned to the integrated ECU 20. The other ECU that constitutes the first test system 1, communicates with the A-control module 120 and the B-control module 130 as a communication partner using the CAN-ID of AECU and the CAN-ID of BECU via CAN 50. The A-control module 120 and the B-control module 130 are referred to as a controlled object.

Furthermore, a configuration of the A-control module 120 is described as follows. The A-control module 120 comprises a response data generation module 121, a diagnostic code storing module 122, a freeze data storing module 123 and a fault detecting module 124.

The response data generation module 121 is a module that generates a fault information command (hereinafter will be described in detail). The fault information command is a response data responding to a fault information sending request command which is sent from the first test apparatus 10.

Also, the diagnostic code storing module 122 is configured to make a diagnostic code which is generated by the fault detecting module 124, to be stored into the memory unit 21, and to read the diagnostic code stored in the memory unit 21 in response to a command by the response data generation module 121 or the like.

The freeze data represents data showing a behavior of the own vehicle and a status of the own apparatus when a fault is detected on the integrated ECU 20. The freeze data storing module 123 is configured to make the freeze data which is generated by the fault detecting module 124, to be stored into the memory unit 21, and to read the freeze data stored in the memory unit 21 in response to a command by the response data generation module 121 or the like.

The fault detecting module 124 is configured to detect the faults occurring in a portion controlled by the A-control module 120 in the own apparatus, to generate a diagnostic code indicating the detected fault. Then, the diagnostic code is stored into the memory unit 21 by the diagnostic code storing module 122. Specifically, the fault detecting module 124 may operate the fault detecting procedure in response to a command by the response data generation module 121 when the own apparatus received the fault information sending request command sent from the first test apparatus 10. Also, the fault detecting module 124 can be configured to operate the fault detecting procedure with a predetermined timing regardless of the reception of the fault information sending request command. The detecting module generates the freeze data showing the behavior of the own vehicle such as a running speed etc, and the status of the own apparatus when the fault is detected by the fault detecting module 124. Then the freeze data is stored into the memory unit 21 by the freeze data storing module 123.

The A-control module 120 further comprises other modules (not shown) for providing functions that the AECU owned. Similarly, the B-control module 130 includes other modules (not shown) for providing a function that the BECU owned in addition to the response data generation module, the diagnostic code storing module, the freeze data storing module and the fault detecting module as well as the modules that the A-control module 120 owns.

Regarding the first ECU 30 and the second ECU 40, they may include a plurality of the controlled objects as well as the integrated ECU 20. Therefore, a plurality of the CAN-IDs can be assigned to the controlled objects.

[Explanation of the Operation]

The operation of the first test system according to the first embodiment will be described as follows.

(1) CAN-ID Reading Procedure

Figure 3:
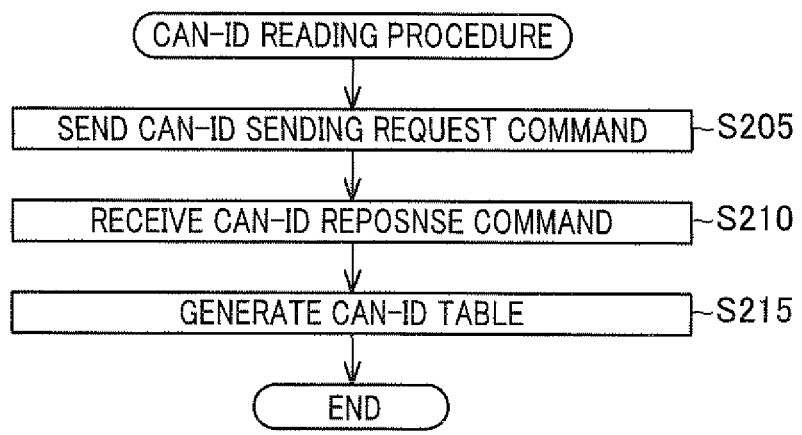
FIG. 3 is a flowchart showing a CAN-ID reading procedure.

With reference to the flowchart flowchart as shown in the FIG. 3, the CAN-ID reading procedure will be described as follows. The CAN-ID reading procedure is to read the entire CAN-IDs owned by ECUs being connected to the CAN 50. The CAN-ID reading procedure is executed by the first test apparatus 10 when the first test system 1 is initialized or the own vehicle starts to run or the first test apparatus 10 starts to inspect the ECUs that constitute the first test system 1.

The memory unit 11 in the first test apparatus 10 stores CAN-IDs assigned to the ECUs being included to the first test system 1, the control unit 13 commands these ECUs to send their CAN-IDs. According to this embodiment, the memory unit 11 stores at least CAN-IDs assigned to the first ECU 30, the second ECU 40, and CAN-IDs assigned to the A-control module 120 and the B-control module 130 that the integrated ECU 20 owns. Then the control unit 13 sends a CAN-ID sending request command to these ECUs (as destinations) from the CAN communication unit 12 via the CAN 50 (S205). The CAN-ID sending request command is a request to send all CAN-IDs assigned to the same ECUs. Specifically, in the FIG. 4A, a block diagram is shown as an example of the CAN-ID sending request command which is a CAN-ID sending request command to the A-control module 120.

Next, at the Step S210, the control unit 13 receives a CAN-ID response command from the destinations to which the CAN-ID sending request command being sent. The CAN-ID response command is a response to the CAN-ID sending request command and includes all the CAN-IDs assigned to the ECUs of the destinations and notify the control unit 13. Specifically, in the FIG. 4B, a block diagram is shown as an example of the CAN-ID response command that is sent from the A-control module 120 in the integrated ECU 20. The control unit 13 proceeds to the step 215 when the control unit 13 receives the CAN-ID response command from the all destinations of the CAN-ID sending request command.

At the step 215, based on the received CAN-ID response command, the control unit 13 generates a CAN-ID table that indicates CAN-IDs corresponding to the ECUs of the destinations to which the CAN-ID sending request command is sent and stores the CAN-ID table generated by the control unit 13 into the memory unit 11. Finally, the control unit 13 terminates the CAN-ID reading procedure. In the FIG. 4, the CAN-ID table is shown.

(2) Configuration of the CAN-ID Sending Request Command and the CAN-ID Response Command Hereinafter will be described the CAN-ID sending request command being sent from the first test apparatus 10 and the CAN-ID response command.

(2-1) CAN-ID Sending Request Command

First, a configuration of the CAN-ID sending request command that is sent from the first test apparatus 10 will be described as follows. In the first test system 1, a test mode ID (0x13) is used for an ID of a command concerning the fault detecting of the ECUs. A request selection ID is assigned to the test mode ID. The request selection ID is used in order to identify the contents of an instruction concerning the fault detecting. The CAN-ID sending request command is a command related to the fault detecting to be commanded by the first test system 10.

As an example of a CAN-ID sending request command, FIG. 4A illustrates a block diagram showing a configuration of a CAN-ID sending request command 300 that commands the A-control module 120. This CAN-ID sending request command 300 is used to command A-control module 120 to send entire CAN-IDs being assigned to the integrated ECU 20. The CAN-ID sending request command 300 comprises a CAN-ID 301, a request selection ID 302 and a test mode ID 303. The CAN-ID 301 is data showing the destination of the CAN-ID sending request command 300 and indicates 0x7E0 that is the CAN-ID of the A-control module 120.

Also, the request selection ID 302 indicates 0x01 and the test mode ID 303 indicates 0x13. The request selection ID 302 and the test mode ID 303 are used to identify the command as the CAN-ID sending request command.

(2-2) CAN-ID Response Command

Next, the CAN-ID response command being sent as a response to the CAN-ID sending request command will be described as follows. As an example, FIG. 4B illustrates a block diagram showing a CAN-ID response command 310 which is sent by the A-control module 120. The CAN-ID response command 310 comprises a response CAN-ID 311, a response test mode ID 312, an assignment count 313 and an assigned CAN-ID 314.

The response CAN-ID 311 is data showing the command which is sent from the A-control module 120. The response CAN-ID 311 indicates 0x7E8 that equals to a value 0x08 added to 0x7E0 that represents the CAN-ID of the A-control module 120.

Similarly, the test mode ID 312 is data showing a response to the test mode ID that is a command concerning the fault detecting. The test mode ID 312 indicates 0x53 that equals to a value 0x40 added to 0x13 that represents the test mode ID.

The assignment count 313 is data showing the number of CAN-IDs assigned to the integrated ECU 120 which has A-control module 120. Also, the assigned CAN-ID 314 is data showing entire CAN-IDs assigned to the integrated ECU 20. The assigned CAN-ID 314 has data including a A-control module 314a and a B-control module 314b. Hence, the CAN-IDs for AECU and BECU being integrated are assigned to the integrated ECU 20. The A-control module 314a indicates 0x7E8 that equals to a value 0x08 added to 0x7E0 that represents the CAN-ID of the AECU. The B-control module 314b indicates 0x7BA that equals to a value 0x08 added to 0x7B2 that represents the CAN-ID of the BECU.

(3) Configuration of the CAN-ID Table

Hereinafter will be described the CAN-ID table which indicates the CAN-IDs assigned to each ECU in the first test system 1. FIG. 4C illustrates a table indicating the CAN-ID table. The CAN-ID table includes two items which are the ID and the CAN-ID.

The ID is an item to distinguish the ECU that constitutes the first test system 1. The CAN-ID is an item that indicates the CAN-ID assigned to the ECU. The CAN-ID table includes records of which IDs are 1, 2, and 3. A record showing ID '1' corresponds to the integrated ECU 20, the CAN-ID indicates 0x7E8 and 0x7BA which are the CAN-ID assigned to the A-control module and the B-control module of the CAN-ID response command respectively. Also, a record showing ID '2' corresponds to the first ECU 30 and a record showing ID '3' corresponds to the second ECU 40.

(4) CAN-ID Sending Procedure

Figure 5:
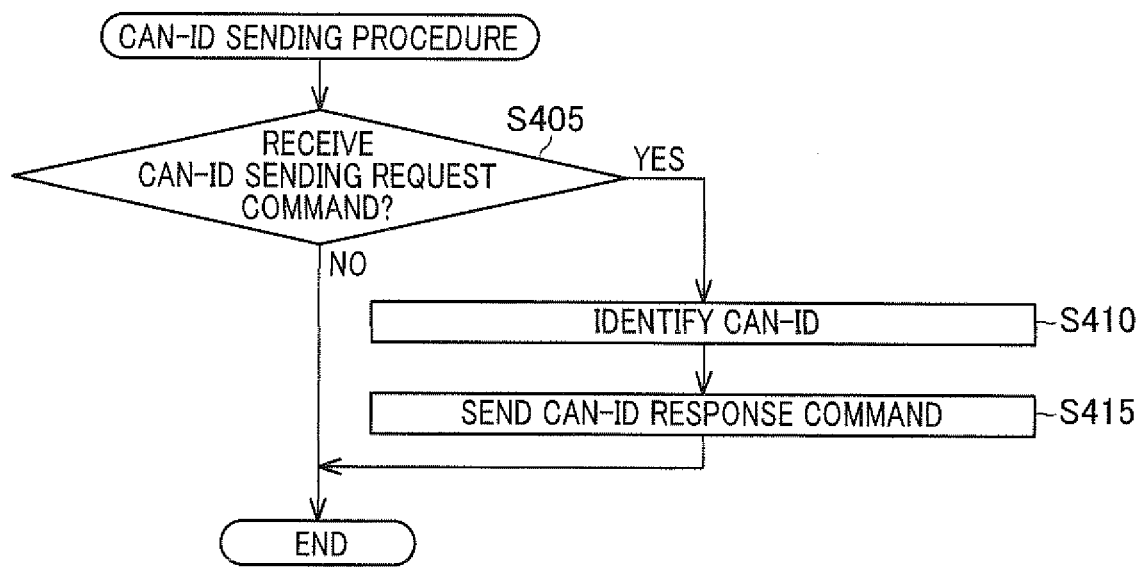
FIG. 5 is a flowchart showing a CAN-ID sending procedure.
Figure 6:
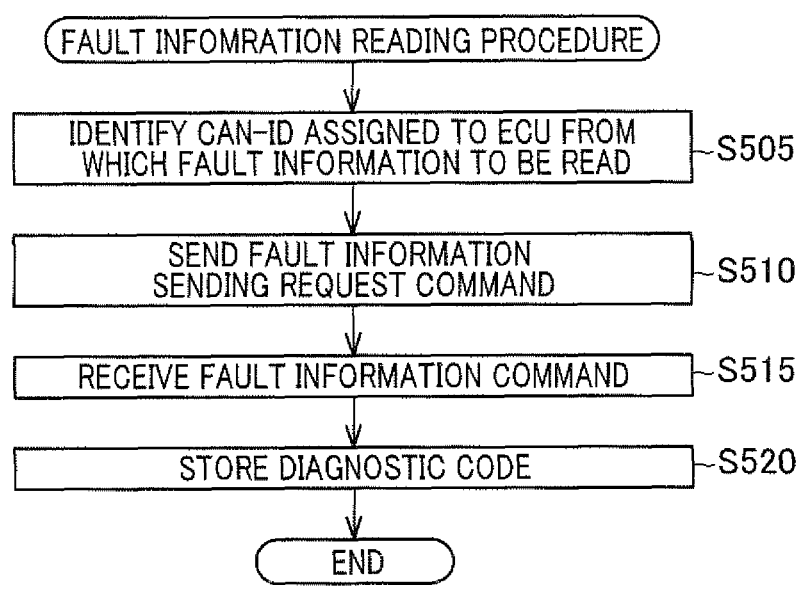
FIG. 6 is a flowchart showing a fault information reading procedure.

Hereinafter will be described the CAN-ID sending procedure with reference to a flowchart as shown in FIG. 5. The CAN-ID sending procedure is executed by the integrated ECU 20 in response to the received CAN-ID sending request sent by the first test apparatus 10. In the procedure, the CAN-ID response command is sent to the first test apparatus 10 as a response. This procedure is periodically executed by the integrated ECU 20. Also, other ECUs constituting the first test system 1 execute similar procedure.

At the step S405, the control unit 23 of the integrated ECU 20 judges whether the CAN-ID sending request command is received or not via the CAN communication unit 22. The control unit 23 of the integrated ECU 20 proceeds to the next step S410 when the CAN-ID sending request command is received (S405: Yes), and the control unit 23 terminates the procedure when the CAN-ID sending request is not received (S405: No).

At the step 410, the control unit 23 identifies the CAN-ID assigned to the own apparatus, i.e., the CAN-IDs assigned to the A-control module 120 and the B-control module 130. Then, based on these CAN-IDs, the control unit 23 generates the CAN-ID response command as shown in the FIG. 4B and sends the command via the CAN communication unit 22 (S415) so as to terminate the procedure. The procedures at the steps 410 and 415 are executed at the controlled object which is a destination of the CAN-ID sending request command.

(5) Fault Information Reading Procedure

Hereinafter will be described the fault information reading procedure which is a procedure in order to read the fault information from the entire ECUs in the first test system 1. For instance, the fault information reading procedure is executed by the first test apparatus 10 when a predetermined operation command is received from the operator through operation panel (not shown).

At the step S505, the control unit 13 of the first test apparatus 10 identifies the CAN-ID of a record being constitutes the CAN-ID table stored in the memory unit 11 as the CAN-ID assigned to the ECU that owns fault information to be read. Specifically, if multiple CAN-IDs assigned to the ECU like a record corresponding to the integrated ECU 20, the CAN-ID having the largest value is identified as the CAN-ID assigned to the ECU that owns fault information to be read.

At the S510, the control unit 13 sends the fault information sending request command to the identified ECU and proceeds to the step S515. The fault information sending command is used to command the indentified ECU to send the fault information via the CAN communication unit 12. When the identified ECU has a plurality of controlled objects so that a plurality of CAN-IDs are assigned like the integrated ECU 20, the control unit 13 commands the identified ECU to send fault information about entire controlled objects. As shown in the FIG. 8A, a block diagram showing the fault information sending request command to the integrated ECU 20 is illustrated.

At the step S515, the control unit 13 receives the fault information command from the ECU that is the destination of the fault information sending request. As shown in the FIG. 8B, it is illustrated a block diagram showing the fault information command which is sent from the integrated ECU 20. The control unit 13 makes the diagnostic code being included in the fault information command associated with the CAN-ID, to be stored to the memory unit 11 (S520). The CAN-ID represents the ECU or the controlled object where the diagnostic code is detected. Subsequently, the control unit 13 terminates the procedure.

The first test apparatus 10 may be configured to detect the fault corresponding to the ECU which is designated by the operator through the (not shown) operator panel in the same manner described above.

(6) Fault Information Sending Procedure

Hereinafter will be described the fault information sending procedure. The fault information sending procedure is executed by the integrated ECU 20 such that the integrated ECU 20 reads and detects the fault information in response to the fault information sending request command sent by the first test apparatus, and sends the fault information command. This procedure is periodically executed by the integrated ECU 20. The fault information sending procedure executed by the integrated ECU 20 is described here, however, with the other ECUs that constitute the first test system 1, the same procedure is applied.

At the step S605, the control unit 23 of the integrated ECU 20 judges whether the fault information sending request command is received from the first test apparatus 10 or not. When the fault information sending request command is received (S605: Yes), the control unit 23 proceeds to the step S610. When the fault information sending request command is not received (S605: No), the control unit 23 terminates the procedure.

At the step S610, the control unit 23 judges whether or not the fault information sending request command is commanded to both of the A-control module 120 of the own apparatus and the B-control module 130. When the fault information sending request is commanded to both control modules (S610: Yes), the control unit 23 proceeds to the step S640. When the fault information sending request is commanded to either the A-control module 120 or the B-control module 130 (S610: No), the control unit 23 proceeds to the step S615.

At the step S615, the control unit 23 judges whether or not the received fault information sending request command is commanded to the A-control unit 120. When the fault information sending request command is commanded to the A-control unit 120 (S615: Yes), the control unit 23 proceeds to the step S620. When the fault information sending request command is sent to the B-control unit 130 (S615: No), the control unit 130 proceeds to the step S630.

At the step S620, the control unit 23 reads out the diagnostic code about the A-control module 120 which is stored in the memory unit 21 and execute the fault detecting procedure concerning the A-control module 120. Then, the control unit 23 generates the fault information command that constitutes the diagnostic code being read from the memory unit 21 and the diagnostic code showing a fault detected by the fault detecting procedure and sends the fault information command to the first test apparatus 10 (S625). Subsequently, the control unit 23 terminates the procedure.

Hereinafter will be described procedures concerning the steps S620 and S625 in detail. The fault information sending request command is received at the communication processing module 110. The communication processing module 110 passes the received fault information sending request command to the response data generation module 121 which is the destination of the fault information sending request command. Then, the response data generation module 121 orders the diagnostic code storing module 122 to read out the diagnostic code from the memory unit 21 and orders the fault detection module 124 to execute the fault detecting procedure. The response data generation module 121 generates the fault information command that constitutes the diagnostic code being read out by the diagnostic code storing module 122 and the diagnostic code generated by the fault detecting processing module 124. Then the communication processing module 110 sends the generated fault information command to the first test apparatus 10.

At the step S630 which is executed when the received fault information sending request command is commanded to the B-control module 130, control unit 23 reads out the diagnostic code about the B-control unit 130 which is stored in the memory unit 21 and executes the fault detecting procedure concerning the B-control unit 130. Then, the control unit 23 generates the fault information command that constitutes the diagnostic code being read out from the memory unit 21 and the diagnostic code showing the fault detected by the fault detecting procedure and sends the fault information command to the first test apparatus 10 (S635). At the steps 630 and 635, the fault information command is generated by the B-control module 130 as well as steps 620 and 625. After sending the fault information command, the control unit 23 terminates the procedure.

At the step S640 which is executed when the received fault information sending request command is commanded to both of the A-control module 120 and the B-control module 130, the control unit 23 reads out and detects the fault information about A-control module 120 and further reads out and detects the fault information about the B-control module 130 (S645). Subsequently, the control unit 23 generates the fault information command based on the diagnostic code which is read out or generated and send the fault information command to the first test apparatus 10 (S650). After sending the fault information command, the control unit 23 terminates the procedure.

Hereinafter will be described the procedures executed steps S640 to S650 in detail. The communication processing module 110 passes the received fault information sending request command to the response data generation module 121 of the A-control module 120 which is the destination of this command, when the destination of the fault information sending request command is the A-control module 120. Then, the response data generation module 121 reads out and generates the diagnostic code as well as the step 620. Also, the response data generation module 121 orders the response data generation module of the B-control module 130 to send/detect the fault information according to the fault information sending request command. The B-control module 130 reads out and generates the diagnostic code as well as the step S630.

Subsequently, the response data generation module 121 of the A-control module 120 generates the fault information command that constitutes the diagnostic code about the A-control module 120 and the diagnostic code about the B-control module 130. Then, the communication processing module 110 sends the generated fault information command to the first test apparatus 10.

The communication processing module 110 passes the fault information sending request command to the response data generation module of the B-control module 130 when the destination of the fault information sending request command is the B-control module 130. The fault information command is generated by the response data generation module of the B-control module 130 as well as when the A-control module is the destination.

(7) Configuration of the Fault Information Sending Request Command and the Fault Information Command
Hereinafter will be described the fault information sending request command that is sent from the first test apparatus 10 and the fault information command that is sent from the integrated ECU 20 or the like.

(7-1) Fault Information Sending Request Command
First, the configuration of the fault information sending request command that is sent from the first test apparatus 10. The fault information sending request command is a command related to the fault detecting as described above.

Figure 8A:
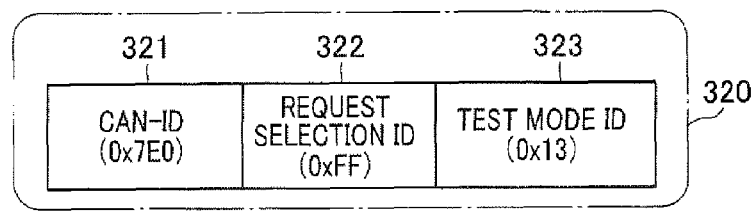
FIGS. 8A to 8B are block diagrams showing commands concerning the fault information.

As shown in FIG. 8A, as an example of the fault information sending request command, it is illustrated a block diagram showing the fault information sending request command 320 of which destination is the CAN-ID of the A-control module 120 being owned by the integrated ECU 20. The fault information sending request command 320 is used to detect the fault occurring at the entire controlled objects that the integrated ECU owns.

The fault information sending request command 320 comprises a CAN-ID 321, request selection ID 322 and test mode ID 323. The CAN-ID 321 is data showing the destination of the fault information sending request command 320, which indicates 0x7E0 as the CAN-ID of the A-control module 120 that the integrated ECU 20 owns.

The request selection ID 322 indicates 0xFF and the test ID 323 indicates 0x13. The integrated ECU 20 identifies this command as a command that orders detection of a fault occurring at the controlled objects being owned by the ECU 20, using the request selection ID 302 and the test mode ID 303.

Figure 8B:
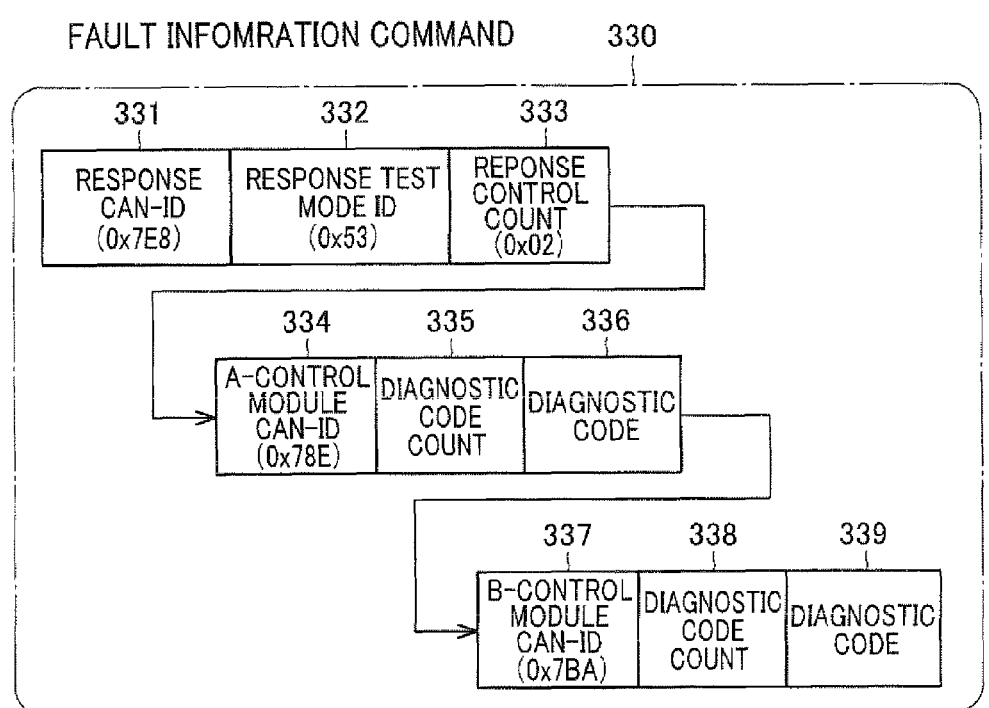

(7-2) Fault Information Command
Hereinafter will be described the configuration of the fault information command being sent as a response to the fault information sending request command. As shown in FIG. 8B, as an example, it is illustrated a block diagram showing the fault information command sent from the A-control module 120 of the integrated ECU 20. The fault information command 330 comprises a response CAN-ID 331, a response test mode ID 332, a response control count 333, an A-control module CAN-ID 334, a diagnostic code count 335, a diagnostic code 336, B-control module CAN-ID 337, a diagnostic code count 338 and a diagnostic code 339.

The response CAN-ID 331 is data showing a response from the A-control module 120 and indicates 0x7E8 that is a value 0x08 added to 0x7E0 that represents the CAN-ID of the A-control module 120.

The response test mode ID 332 is data showing a response to the test mode ID which is a command concerning the fault detecting and indicates 0x53 that is a value 0x40 added to 0x13 that represents the test mode ID.

Also, the response control count 333 is data showing the number of entire CAN-IDs assigned to the integrated ECU 20 that owns the A-control module 120. The A-control module CAN-ID 334 is data showing the CAN-ID of the A-control module 120. The diagnostic code count 335 that is next to the A-control module CAN-ID 334 is data showing the number of CAN-IDs that is detected by the A-control module 120. Next, the diagnostic code 336 is data showing the diagnostic code detected by the A-control module 120. The A-control module CAN-ID 334 indicates 0x7E8 that is a value 0x08 added to 0x7E0 that represents the CAN-ID of the A-control module 120.

Further, B-control module CAN-ID 337 is data showing the CAN-ID of the B-control module 130 and the following diagnostic code count 338 is data showing the number of diagnostic code which is detected by the B-control module 130. Similarly, the following diagnostic code 339 is data showing a diagnostic code which is detected by the B-control module 130. The B-control module CAN-ID 337 indicates 0x7BA that is a value 0x08 added to 0x7B2 that represents the CAN-ID of the B-control module 130.

[Effects and Advantages]

In the first test system 1, the first test apparatus 10 sends the fault information sending request command to the A-control module 120 of the integrated ECU 20 as the destination in order to demand sending the fault information about the entire controlled objects that the ECU 20 owns. Accordingly, compared to the procedure that requires sending commands to both A-control module 120 and the B-control module 130 separately, a processing load for reading the fault information from the integrated ECU 20 can be significantly reduced. As a result, increasing number of programming steps to execute the inspection and required time for the inspection can also be suppressed.

Also, in the first test system 1, the fault information sending request command that is sent to the integrated ECU 20 by the first test apparatus 10 owns the test mode ID (0x13) which is the ID of a command to the ECU concerning the fault detecting. In addition, the request selection ID (0xFF) is added to the fault information sending request command. In the integrated ECU 20, by using the test mode ID and the request selection ID, the fault information sending request command is identified as a command that demands sending the fault information about the entire controlled objects in the integrated ECU 20. For this reason, without significant modification of the CAN 50 protocol which is conventionally used, command that demands sending the fault information about the entire controlled objects in the ECU 20 can be newly arranged. Accordingly, the integrated ECU 20 and the first test apparatus 10 can be developed without large modification of the hardware/software which is conventionally used. Therefore, a developing cost required for the integrated ECU 20 or the like can be reduced.

Moreover, in the first test system 1, the first test apparatus 10 sends the CAN-ID sending request command to the destinations such as the first ECU 30, A-control module 120 and B-control module 130, and received the CAN-ID response command as a response to the CAN-ID sending request command. Then, the first test apparatus 10 generates the CAN-ID table based on the received CAN-ID response command. Therefore, the first test apparatus can accurately recognize the CAN-ID assigned to the each ECU being connected to the CAN 50. Accordingly, when the first test apparatus commands the integrated ECU 20 to send the fault information, accidentally sending the command for a multiple times can be avoided i.e., accidentally sending the fault information sending request command to the A-control module 120 and the B-control module 130 for multiple times can be avoided. As a result, reading the fault information can be done efficiently.

Second Embodiment

With reference to the drawings FIGS. 9A-9B to 11A-11B, hereinafter will be described the second test system according to the second embodiment of the present invention.

[Explanation of the Configuration]

Figure 9A:
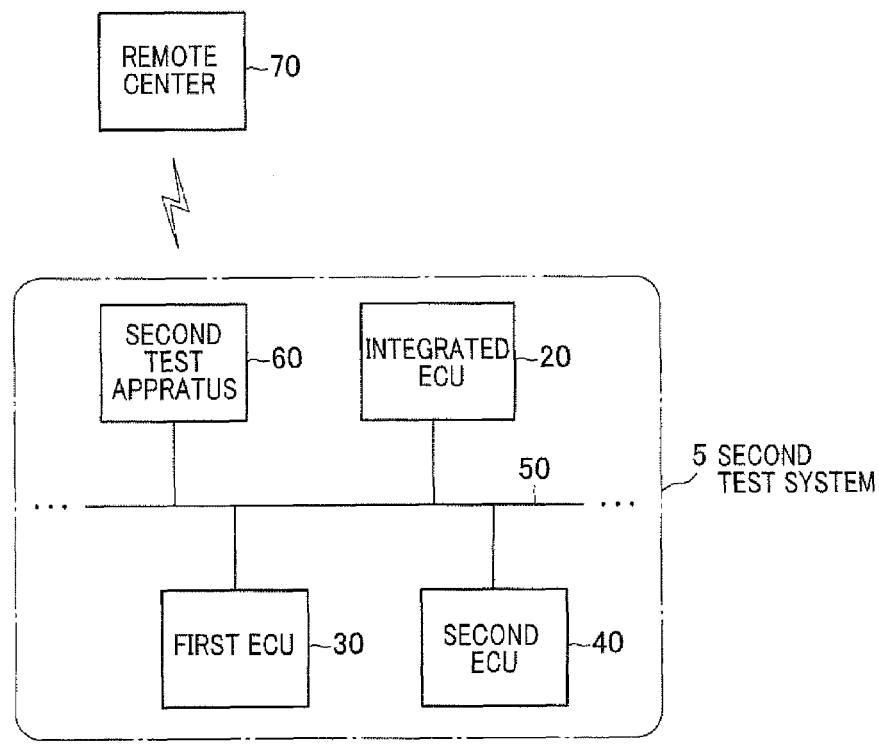
FIGS. 9A to 9B are block diagrams showing configurations of the second test system and the apparatus according to a second embodiment of the present invention.

FIG. 9A illustrates a block diagram showing a configuration of the second test system 5 according to the second embodiment. The second test system 5 is mounted on the vehicle and includes the second test apparatus 60, the integrated ECU 20 as similar to the first test system according to the first embodiment, the first ECU 30 and the second ECU 40. These units are mutually connected by the CAN 50. The second test apparatus 60 can communicate with the remote center. In addition to these ECUs, the second test system 5 owns other ECU which is not shown.

Figure 9B:
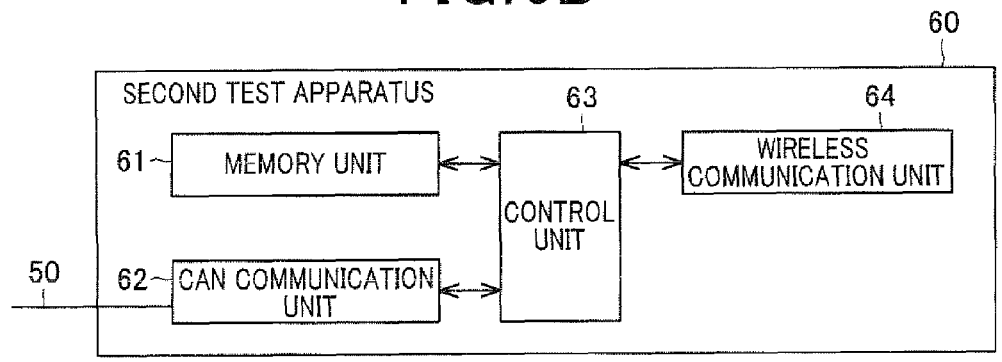

Next, a configuration of the second test apparatus 60 will be described with reference to FIG. 9B. The second test apparatus 60 includes a memory unit 61, a CAN communication unit 62, a control unit 63 as similar to the first test apparatus 10 according to the first embodiment and a wireless communication unit 64.

Regarding the configuration comprising of the memory unit 61, the CAN communication unit 62 and the control unit 63 is similar to the configuration of the first test apparatus, the explanation thereof will be omitted. The wireless communication unit 64 is a unit to handle the wireless communication to the remote center 70. For instance, the wireless communication unit 64 may access to a mobile communication network (not shown) by a wireless communication protocol and establishes the wireless communication with the remote center 70 via the mobile communication network.

Figure 10A:
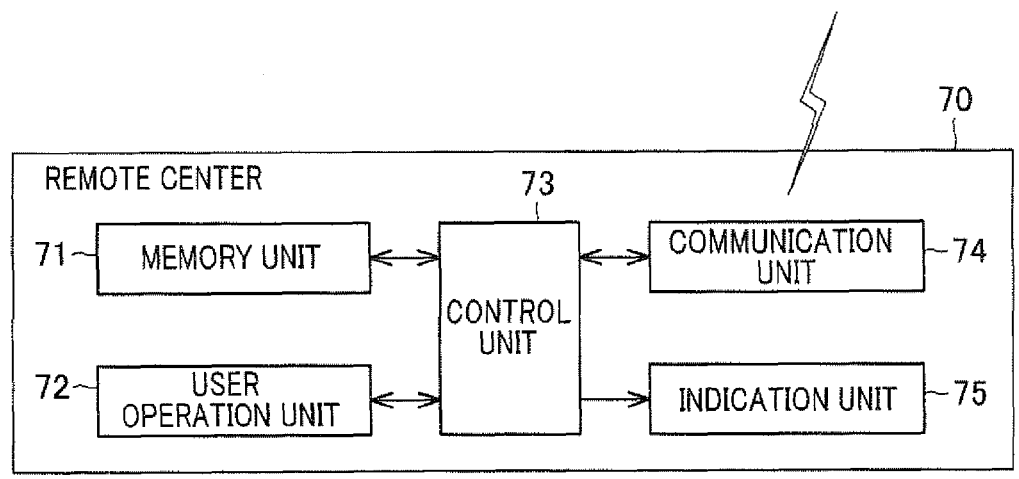
FIGS. 10A and 10B are a block diagram showing a configuration of a remote center and a flowchart showing a procedure of CAN-ID reading instruction.

Next, a configuration of the remote center 70 will be described with reference to a block diagram as shown in FIG. 10A. The remote center 70 comprises a memory unit 71, a user operation unit 72, a control unit 73, a communication unit 74 and an indication unit 75.

The memory unit 71 is configured as devices that do not require the memory retention such as a Flash memory or a HDD (Hard Disk Drive) and can store various types of information. The user operation unit 72 is receives various instruction to be operated from the operator.

The control unit 73 comprises CPU (Central Processing Unit), ROM (Read Only Memory), RAM (Random Access Memory) and I/O (input and output). The control unit 73 controls each portions being constitute as the remote center 70. Also, the control unit 73 operates various processing on the basis of a program stored in the ROM and a program being loaded to the RAM.

The communication unit 74 is a portion that communicates with the second test apparatus 60. For instance, the wireless communication unit 74 may access to a mobile communication network (not shown) by a wired or a wireless communication and establishes the communication with the second test apparatus 60 via the mobile communication network.

The indication unit 75 is a portion that indicates various data.

[Explanation of the Operation]

Hereinafter will be described an operation of the second test system 5 and the remote center 70 according to the second embodiment.

(1) Procedure of CAN-ID Reading Instruction

Figure 10B:
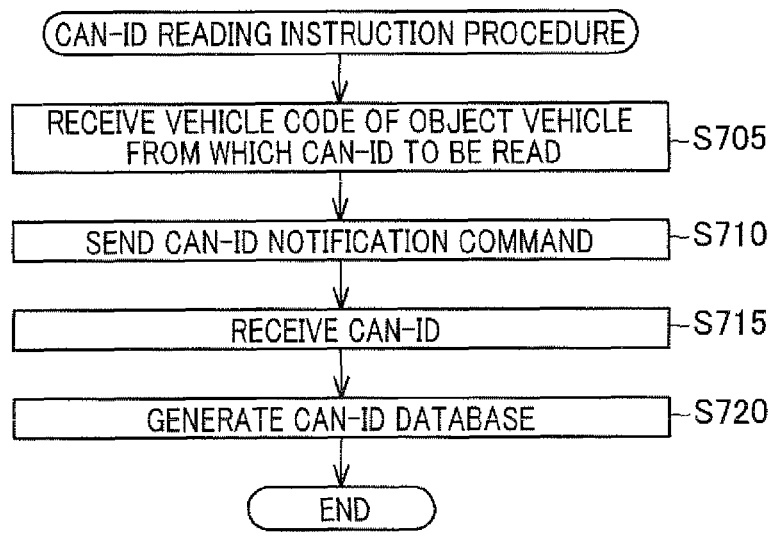

Hereinafter will be described the procedure of the CAN-ID reading instruction with reference to a flowchart as shown in FIG. 10B. The procedure of the CAN-ID reading instruction is to order the second test apparatus 60 that is mounted on a vehicle to send the CAN-ID assigned to each ECU in the second test system 5. This procedure is processed on the basis of a request by the operator.

At the step S705, the control unit 73 of the remote center 70 receives the vehicle code from the operator via the user operation unit 72. The vehicle code represents the identification of the vehicle in which the second test apparatus 60 is mounted.

The control unit 73 indentifies the second test apparatus 60 as a communication partner based on the received vehicle code. Then, the control unit 73 sends a CAN-ID notification command to the identified second test apparatus 60 (S710). The CAN-ID notification command is a request command to send the entire CAN-ID assigned to the each ECU that is connected the second test apparatus 60.

In the second test apparatus 60 that received the CAN-ID notification command or the ECU in the second test system 5 that owns the second test apparatus 60, the CAN-ID reading procedure and the CAN-ID sending procedure are executed and the CAN-ID table is generated. Then, as a response to the CAN-ID notification command, the second test apparatus 60 sends the CAN-ID information which is the same information of the CAN-ID table to the remote center 70.

Subsequently, at the step 715, the control unit 73 receives the CAN-ID from the second test apparatus 60 which is the destination of the CAN-ID notification command. The control unit 73 renews the CAN-ID database as shown in FIG. 11A (5720) using the received CAN-ID information and terminates the procedure.

(2) CAN-ID Database

Figures 11A, 11B:
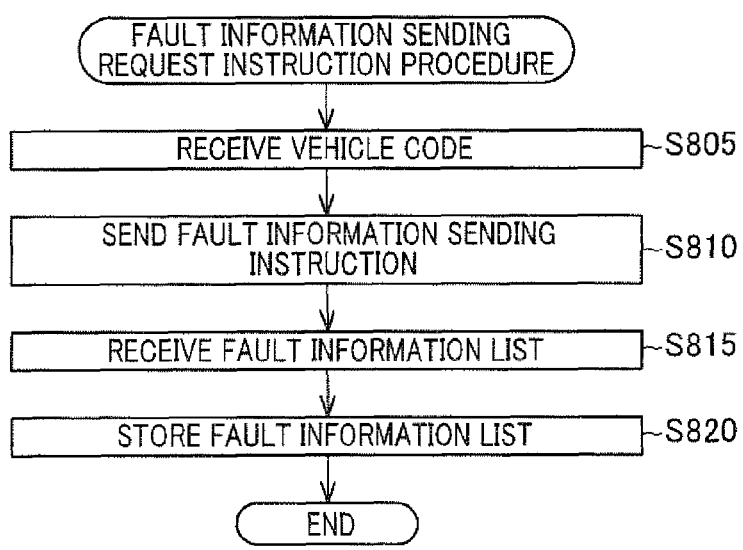
FIGS. 11A and 11B are a table showing a CAN-ID database and a flowchart showing a procedure of a fault information sending instruction.

Next, with reference to a table as shown in FIG. 11A, the CAN-ID database in which the vehicle code and corresponding CAN-IDs assigned to the each ECU are registered, will be described as follows. The vehicle code represents the vehicle in which the second test apparatus 60 as the destination of the CAN-ID notification command is mounted. The CAN-IDs are assigned to the each ECU being constitutes the second test system 5 which is mounted on the vehicle. The CAN-ID comprises the vehicle code, the ID and the CAN-ID.

The vehicle code is ID information of the vehicle in which the second test apparatus 60 as the destination of the CAN-ID notification command is mounted. The ID is an item to distinguish the each ECU being constitutes the second test system 5 mounted on the vehicle that is identified by the corresponding vehicle ID. The CAN-ID is an item showing the CAN-ID assigned to the ECU that the ID indicates. The ID and the CAN-ID are the same items as the ID and the CAN-ID in the CAN-ID table according to the first embodiment.

(3) Procedure of the Fault Information Sending Instruction

Hereinafter will be described the procedure of the fault information sending instruction with reference to a flowchart as shown in FIG. 11B. The fault information sending instruction is sent by the remote center 70, sent to the second test apparatus 60 mounted on either vehicle in a plurality of vehicles in order to instruct the second test apparatus 60 to send the fault information about each ECU that constitutes the second test system 5. This procedure is processed on the basis of a request by the operator.

At the step S805, the control unit 73 of the remote center 70 receives the vehicle code indicative of an identification of the vehicle on which the second test apparatus 60 is mounted, from the operator via the user operation unit 72. Then, based on the CAN-ID database stored in the memory unit 71, the control unit 73 allows the indication unit 75 to indicate a list of the CAN-ID being assigned to the ECUs mounted on the vehicle corresponding to the vehicle code. After the indication of such information, the control unit 73 receives a selection of the ECU to be an object to read out the fault information.

At the step S810, based on the received vehicle code, the control unit 73 identifies the second test apparatus 60 as a communication partner and sends the fault information sending instruction to the identified second test apparatus 60 via the communication unit 74. The fault information sending instruction orders the second test apparatus 60 to send the fault information about the selected ECU.

As similar to the first embodiment, in the second test apparatus 60 which received the fault information sending instruction or the ECU which constitutes the second test system 5 having the second test apparatus 60, the fault information reading procedure and the procedure of the fault information sending request are executed. The second test apparatus 60 generates the fault information list in which information showing the received diagnostic code from the ECU associated with corresponding ECU or the controlled objects are registered. Then, the second test apparatus 60 sends the generated fault information list to the remote center 70 via the wireless communication.

At the step S815, the control unit 73 receives the fault information list from the second test apparatus 60 which is the destination of the fault information sending instruction. Then, the control unit 73 stores the received fault information list to the memory unit 71 (S820) and terminates the procedure.

[Effects and Advantages]

The second test apparatus 60 of the second test system 5 reads out the fault information about the integrated ECU 20 or the like in response to a command from the remote center 70 via the wireless communication. Then, the second test apparatus 60 sends the fault information list including the received diagnostic code from the integrated ECU 20 or the like to the remote center 70. Therefore, the system can provide an advantage such that the fault information about the ECU 20 or the like can be read out even from the remote area.

Also, the remote center 70 sends the CAN-ID notification command that demands sending the entire CAN-IDs assigned to the each ECU connected to the second test apparatus 60, to the second test apparatus 60. When the remote center 70 receives the CAN-ID information as a response to the CAN-ID notification command, the remote center 70 renews the CAN-ID database based on the received CAN-ID information. Therefore, the remote center 70 can recognize a plurality of the CAN-IDs assigned to the integrated ECU 20 whereby reading the fault information from the integrated ECU 20 can be achieved efficiently.

Other Embodiments (1) The integrated ECU 20 owns two controlled objects such as the A-control module 120 and the B-control module 130, however, the integrated ECU 20 may own more than three controlled objects. According to the first embodiments, the first test apparatus 10 requires to read the fault information about all controlled objects which are assigned to the integrated ECU 20. However, the fault information sending request command can be configured such that the CAN-IDs used for reading the fault information about the controlled objects are set separately for every controlled objects. The integrated ECU 20 receiving this fault information sending request command may send the diagnostic codes being owned by the controlled objects corresponding to the CAN-ID set in this command, to the first test apparatus 10. Even with this configuration, reading the fault information at the plurality of the controlled objects can be done at the same time whereby the processing load when reading the fault information can be significantly reduced.

(2) The first test apparatus 10 according to the first embodiment is mounted on the vehicle as a member of the first test system 1, however, the first test apparatus 10 may be temporarily connected to the vehicle via the CAN 50 only when the inspection is needed. With this configuration, the same effects and advantages as the first embodiment can be obtained.

(3) In the integrated ECU 20, when the fault information sending request command to the A-control module 120 and the B-control module 130 is received, the controlled objects of the destination generates the fault information command as a response data. However, for instance, in response to the fault information sending request command, the communication processing module 110 may command the A-control module 120 and the B-control module 130 to detect the fault. Then, the communication processing module 110 may generates the fault information command based on the diagnostic codes generated by each controlled object and sends the command to the test apparatus. With this configuration, the same effects and advantages as the first embodiment can be obtained.

Hereinafter will be described the correspondence between terms which have been used in the above described embodiments and terms described in claims.

The integrated ECU 20 corresponds to the control apparatus, the CAN 50 corresponds to the vehicle LAN and the CAN-ID corresponds to the communication ID. Moreover, the CAN communication unit 12 of the first test apparatus 10 corresponds to the second communication means. The control unit 13 corresponds to the fault information reading means and ID obtaining means. The memory unit 11 and the control unit 13 correspond to the memory control means.

The CAN communication unit 22 disposed in the integrated ECU 20 corresponds to the first communication means, the control unit 23 corresponds to the transmission control means and ID notifying means. Also, the CAN communication unit 62 disposed in the second test apparatus 60 corresponds to the second communication means. The control unit 63 corresponds to the fault information reading means, the sending means, the ID obtaining means and the communication ID sending means. The wireless communication unit 64 corresponds to the wireless communication means.

The control unit 73 disposed in the remote center 70 corresponds to the sending request means. The communication unit 74 corresponds to the remote communication means.

Further, the fault information command corresponds to the response command, the CAN-ID sending request command corresponds to the communication ID sending request command. The request selection ID corresponds to the additional code and the CAN-ID notification command corresponds to the ID notification command.

What is claimed is:

1. A test system for detecting a fault in control of a vehicle, having a plurality of apparatuses mutually communicable via a network arranged in the vehicle, the apparatuses being mutually communicable based on a communication protocol applied to the network, the system comprising:
   a plurality of objects each being controlled which executes a series of procedure to perform at least one function thereby controlling the vehicle, at least one of the objects including a fault detecting module that detects fault information about fault occurring at the object in control of the vehicle, the object being assigned with an unique communication ID defined by the communication protocol;
   a first apparatus comprising a first control unit, mounted on the vehicle, being connected to the network, the first apparatus including two or more objects as a first object among the plurality of the objects assigned to the first control unit to be controlled thereby, and the first apparatus being assigned with an unique communication ID defined by the communication protocol and having entire communication IDs assigned to the two or more objects;
   a second apparatus comprising a second control unit, mounted on the vehicle, being connected to the network and mutually communicable with the first apparatus via the network, the second apparatus including at least one object as a second object among the plurality of objects assigned to the second control unit to be controlled thereby, and second apparatus being assigned with an unique communication ID defined by the communication protocol;
   first communication means adapted to the first apparatus for communicating with the second apparatus via the network, receiving data sent from the second apparatus, the data being sent to any one of the two of more objects as the first object determined by the communication ID, included in the first apparatus and sending data concerning the any one of the two of more objects as the first object to the second apparatus;
   a test apparatus being electrically connected to the first apparatus via the network;
   fault information reading means adapted to the test apparatus for reading fault information at the first object included in the first apparatus, the fault information reading means sending a sending request command to the first apparatus;
   a second communication means adapted to the test apparatus for communicating with any one of the two of more objects as the first object included in the first apparatus; and
   transmission control means adapted to the first apparatus for transmitting the fault information at the first object included in the first apparatus, to the test apparatus in response to the sending request command, the transmission control means generating a response command indicative of the fault information detected by the fault detecting module and to order the first communication means to transmit the response command to the test apparatus, wherein
   the first object executes the series of procedure in response to the data received by the first communication means which is sent from the second apparatus,
   the fault information reading means is configured to send the sending request command via the second communication means, to any one of the two of more objects as the first object to send both the fault information included in the any one of the two of more objects as the first object and the fault information included in an object other than the any one of the two of more objects as the first object;
   and the transmission control means is configured to order the first communication means to transmit the fault information detected by the fault detecting module being included in the any one of the two of more objects as the first object designated by the sending request command, to the test apparatus when the first communication means receives the sending request command.

2. The test system according to claim 1, wherein the sending request command sent to any one of the two of more objects as the first object includes an additional code that orders to detect the fault information at an object other than the any one of the two of more objects as the first object to which the sending request command is sent, and the transmission control means, based on the additional code, generates the response command indicative of the fault information to include the fault information concerning the any one of the two of more objects as the first object to which the sending request command is sent.

3. The test system according to claim 2, wherein
the test apparatus is mounted on the vehicle at which the first apparatus is mounted.

4. The test system according to claim 2, wherein
the test apparatus further comprising:
an ID obtaining means configured to send an ID request command to any one of the two of more objects as the first object via the second communication means, wherein the ID request command is a request to send the entire communication IDs that the first apparatus concerning the first object owns; and
a memory control means configured to receive a plurality of the communication IDs as a response to the ID request command via the second communication means, to have the plurality of the communication IDs grouped and to store the grouped communication ID;
the first apparatus further comprising an ID notifying means configured to send the entire communication ID of first object that the first apparatus owns to the test apparatus via the first communication means, when the first apparatus received the ID request via the first communication means.

5. The test system according to claim 3,
wherein the test apparatus further comprising:
an ID obtaining means configured to send an ID request command to any one of the two of more objects as the first object via the second communication means, wherein the ID request command is a request to send the entire communication ID that the first apparatus concerning the first object owns; and
a memory control means configured to receive a plurality of the communication IDs as a response to the ID request command via the second communication means, to have the plurality of the communication IDs grouped and to store the grouped communication ID;
the first apparatus further comprising an ID notifying means configured to send the entire communication ID of first object that the first apparatus owns to the test apparatus via the first communication means, when the first apparatus received the ID request via the first communication means.

6. The test system according to claim 3, wherein
the test apparatus further comprising:
a wireless communication means configured to communicate with a remote center being arranged outside the system, the fault information reading means is configured to send the sending request command in response to a command received from the remote center via the wireless communication means; and
a sending means that is configured to send the fault information to the remote center via the wireless communication means when the test apparatus receives the fault information as a response to the sending request command, from the test apparatus via the second communication means.

7. The test system according to claim 6, wherein the test apparatus further comprising:
an ID obtaining means configured to send an ID request command in response to a received command from the remote center, to any one of the two of more objects as the first object via the second communication means, wherein the ID request command is a request to send the entire communication ID that the first apparatus concerning the first object owns; and
an ID sending means configured to send a plurality of communication IDs to the remote center via the wireless communication means when the test apparatus received the communication ID in response to the ID request command via the second communication means,
wherein the first apparatus further comprises an ID notifying means configured to send the entire communication ID of the first object that the first apparatus owns to the test apparatus via the first communication means, when the first apparatus received the ID request via the first communication means.

8. The remote center performing wireless communication with the test apparatus according to claim 6, wherein
the remote center further comprises a remote communication means configured to communicate with the test apparatus via the wireless communication and a sending request means configured to send a request to the test apparatus via the remote communication means, the request requires sending fault information.

9. The remote center performing wireless communication with the test apparatus according to claim 7, wherein
the remote center further comprises a remote communication means configured to communicate with the test apparatus via the wireless communication and a sending request means configured to send a request to the test apparatus via the remote communication means, the request requires sending fault information.

10. The remote center according to claim 8, wherein the sending request means is configured to send an ID notification command that requires the communication ID assigned to each one of the two of more objects as the first object that the first apparatus owns, to the test apparatus via the remote communication means; the remote center receives a plurality of the communication IDs from the test apparatus as a response to the ID notification command via the remote communication means, make the plurality of the communication IDs grouped and store the grouped communication ID associated with a vehicle ID of the vehicle at which the test apparatus is mounted.

11. The test system according to claim 2, wherein the transmission control means generates, based on the additional code, the response command to include the communication IDs being assigned to the first object of which fault information to be indicated in the response command.

12. The test system according to claim 6, wherein
the test apparatus is configured to receive, via the wireless communication, a request from a remote communication means of the remote center, the request requiring sending of fault information.

13. The test system according to claim 7, wherein
the test apparatus is configured to receive, via the wireless communication, a request from a remote communication means of the remote center, the request requiring sending of fault information.

14. The test system according to claim 8, wherein
the test apparatus is configured to receive, from the remote communication means of the remote center, an ID notification command that requires the communication ID assigned to each of the two of more objects as the first object that the first apparatus owns;
the test apparatus is configured to transmit to the remote center a plurality of the communication IDs as a response to the received ID notification command, so that the plurality of the communication IDs are grouped and the grouped communication IDs associated with a vehicle ID of the vehicle at which the test apparatus is mounted are stored.

15. A test system for detecting a fault in control of a vehicle, having a plurality of apparatuses mutually communicable via a network arranged in the vehicle, the apparatuses being mutually communicable based on a communication protocol applied to the network, the system comprising:

a plurality of objects each being controlled which executes a series of procedure to perform at least one function thereby controlling the vehicle, the object including a fault detecting module that detects fault information about fault occurring at the object in control of the vehicle, the object being assigned with an unique communication ID defined by the communication protocol;

a first apparatus comprising a first control unit, mounted on the vehicle, being connected to the network, the first apparatus including two or more objects as a first object among the plurality of the objects assigned to the first control unit to be controlled thereby, and the first apparatus being assigned with an unique communication ID defined by the communication protocol and having entire communication IDs assigned to the two or more objects;

a second apparatus constituted by a second control unit, mounted on the vehicle, being connected to the network and mutually communicable with the first apparatus via the network, the second apparatus including at least one object as a second object among the plurality of objects assigned to the second control unit to be controlled thereby, the second apparatus being assigned with an unique communication ID defined by the communication protocol;

first communication interface adapted to the first apparatus for communicating with the second apparatus via the network, receiving data sent from the second apparatus, the data being sent to any one of the two or more objects as the first object determined by the communication ID, included in the first apparatus and sending data concerning the any one of the two of more objects as the first object to the second apparatus;

a test apparatus being electrically connected to the first apparatus via the network;

fault information reader adapted to the test apparatus for reading fault information at the first object included in the first apparatus, the fault information reader sending a sending request command to the first apparatus;

a second communication interface adapted to the test apparatus for communicating with any one of the two of more objects as the first object included in the first apparatus; and transmission controller adapted to the first apparatus for transmitting the fault information at the first object included in the first apparatus, to the test apparatus in response to the sending request command, the transmission controller generating a response command indicative of the fault information detected by the fault detecting module and to order the first communication interface to transmit the response command to the test apparatus, wherein the first object executes the series of procedure in response to the data received by the first communication means which is sent from the second apparatus, the fault information reader is configured to send the sending request command via the second communication interface, to any one of the two or more objects as the first object to send both the fault information included in the any one of the two of more objects as the first object and the fault information included in an object other than the any one of the two of more objects as the first object;

and the transmission controller is configured to order the first communication interface to transmit the fault information detected by the fault detecting module being included in the any one of the two of more objects as the first object designated by the sending request command, to the test apparatus when the first communication interface receives the sending request command.

* * * * *